(12) United States Patent
Jackson

(10) Patent No.: US 6,792,427 B2
(45) Date of Patent: Sep. 14, 2004

(54) RULES-BASED, AUTOMATIC GENERATION OF JOURNAL ENTRIES

(75) Inventor: Jared Joseph Jackson, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 296 days.

(21) Appl. No.: 09/885,926

(22) Filed: Jun. 22, 2001

(65) Prior Publication Data

US 2002/0198890 A1 Dec. 26, 2002

(51) Int. Cl.$^7$ .............................................. G06F 17/00
(52) U.S. Cl. ..................................................... 707/100
(58) Field of Search ........................... 707/10, 100, 102, 707/3; 709/227, 229; 700/83; 715/522

(56) References Cited

U.S. PATENT DOCUMENTS 5,913,212 A * 6/1999 Sutcliffe et al. ................ 707/6
6,119,117 A * 9/2000 Yoda et al. .................... 707/10
2003/0055983 A1 * 3/2003 Callegari ..................... 709/227

* cited by examiner

Primary Examiner—Safet Metjahic
Assistant Examiner—Etienne P. Leroux
(74) Attorney, Agent, or Firm—Lacasse & Associates, LLC; Randy W. Lacasse; Jaclyn A. Schade

(57) ABSTRACT

A system for record keeping that utilizes the advances in computer technology and alleviates problems such time constraints by monitoring information about a person or resource and automatically generating journal entries for that person or resource at the appropriate times. The appropriate times for entry generation can be defined for each individual through a rules-based mechanism. When an individual's rules are met, a journal entry is automatically generated according to a template defined in the computer system. The entry is placed in the individual's electronic journal, and, if desired, the individual can be notified of the generated entry or delay entry of said journal entry until receiving a notification at a later designated time.

17 Claims, 6 Drawing Sheets

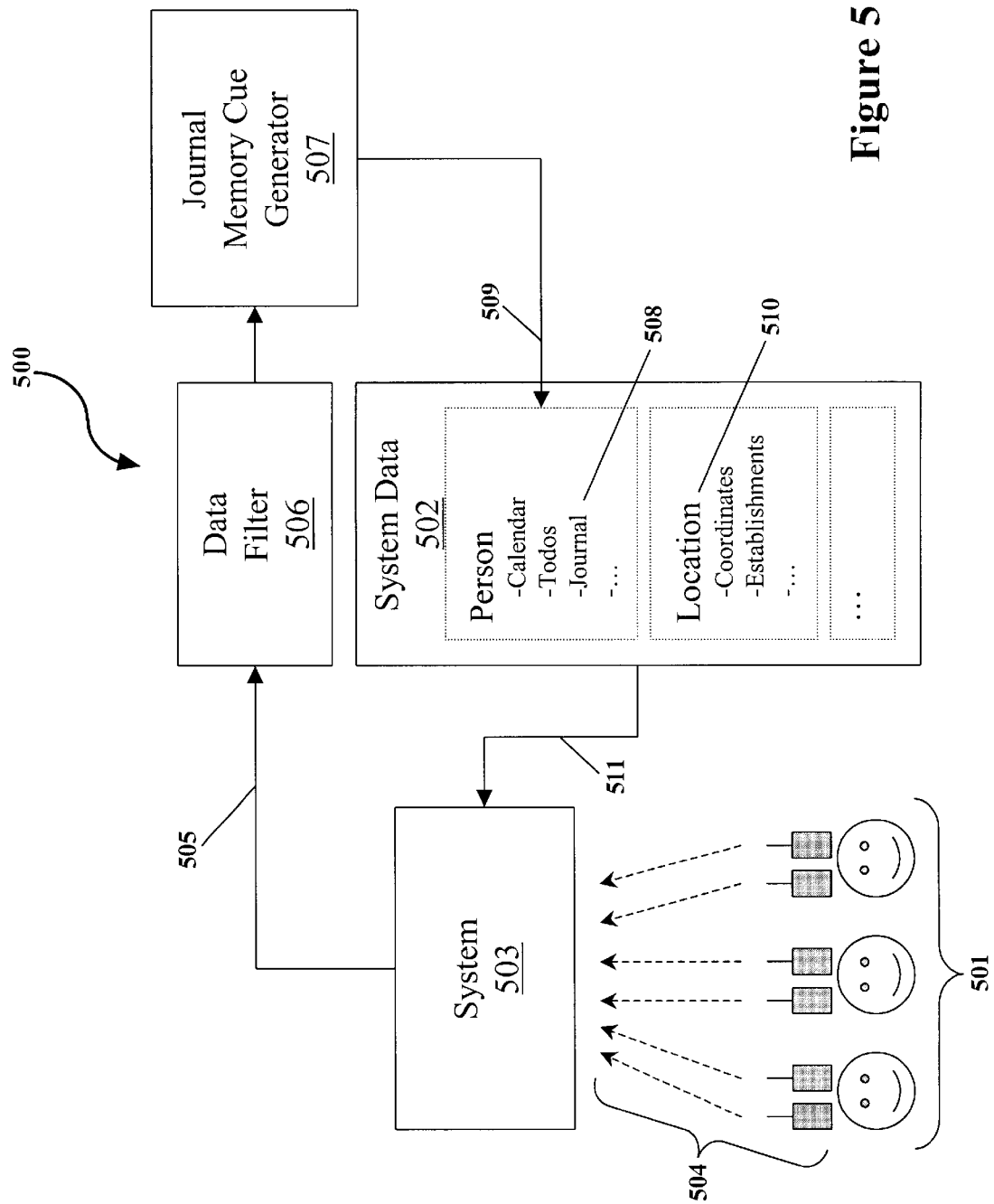

```
<?xml version="1.0" ?>
- <JournalRuleSet name="Birthday Gathering">
   - <Rule name="rule1" type="Gathering">
        <Group name="Friends" type="Addressbook Group" />
        <MinimumParticipants>5</MinimumParticipants>
        <GatheringRadius units="kilometers">0.1</GatheringRadius>
      - <ReturnTypes>
           <Type name="ParticipantList" />
           <Type name="Location" />
           <Type name="Time" />
           <Type name="Duration" />
        </ReturnTypes>
     </Rule>
   - <Rule name="rule2" type="Event">
        <EventType>Birthday</EventType>
      - <Participant>
           <FromGroup>Friends</FromGroup>
        </Participant>
        <MinimumParticipants>1</MinimumParticipants>
        <EventTime rule="equal" unit="date" />
      - <ReturnTypes>
           <Type name="Date" />
           <Type name="ParticipantList" />
        </ReturnTypes>
     </Rule>
     <RuleLogic>rule1 AND rule2</RuleLogic>
   - <Entry>
        At
        <Return fromRule="rule1" type="Time" />
        , my friends,
        <Return fromRule="rule1" type="ParticpantList" />
        , met together at
        <Return fromRule="rule1" type="Location" />
        to celbrate the birthday of
        <Return fromRule="rule2" type="ParticipantList" />
        . We partied together for
        <Return formRule="rule1" type="Duration" />
        .
     </Entry>
  </JournalRuleSet>
```

Figure 6

RULES-BASED, AUTOMATIC GENERATION OF JOURNAL ENTRIES

BACKGROUND OF THE INVENTION

1. Field of Invention

The present invention relates generally to the field of electronic record keeping. More specifically, the present invention is related to gathering and storing input data and automatically generating journal entries according to a rules-based mechanism.

2. Discussion of Prior Art

Many people desire to keep some sort of formal account of their personal or professional doings. Unfortunately, life is often so busy that most either do not wish to take the time to record events that happen in their life or simply do not remember to do so until after a good recollection of those events has already passed. Therefore, individuals find it difficult to maintain the level of journaling they desire for their personal and professional lives. Even those who do keep a diary or journal on a regular basis often wish that their record was more complete.

In addition, corporate entities must often spend valuable resources trying to record and maintain histories of all of their business events. The rise of pervasive computing and wireless electronic communication has increased the amount of information available electronically to those people making extensive use of these technologies. While such information seems to be potentially harmful if used inappropriately, it may also be used to significantly benefit a person who utilizes these resources wisely.

Information about a person, such as location, time, proximity of associates, and events, has always been the crux of information recorded in a journal or diary. Current event archiving systems are error-prone and often of inconsistent format. With all of this information now potentially available to a single computer system, the journal entry process can be extended to become more automated.

The prior art has failed to provide for a fully automated rules-based journal mechanism.

SUMMARY OF THE INVENTION

A system for journal entry generation continuously receives information from a person or group of people and compares that information through a rules-based mechanism. If the mechanism determines that an entry should be generated, it passes the data obtained by the system along with the appropriate template to a journal entry generator. The generator then uses the information to populate the template as appropriate to create the journal entry. The entry is placed in the person's electronic journal, and, if desired, some form of notification can be sent to the person of the entry's creation.

In an alternative embodiment, memory cues can be set up in advance to assist a user in entering or acknowledgment of entries to a journal at a predefined later time.

BRIEF DESCRIPTION OF THE DRAWINGS

FIG. 5 illustrates a second embodiment of the system's automatic journal entry generator.

FIG. 6 illustrates a sample journal template.

DESCRIPTION OF THE PREFERRED EMBODIMENTS

Figure 1:
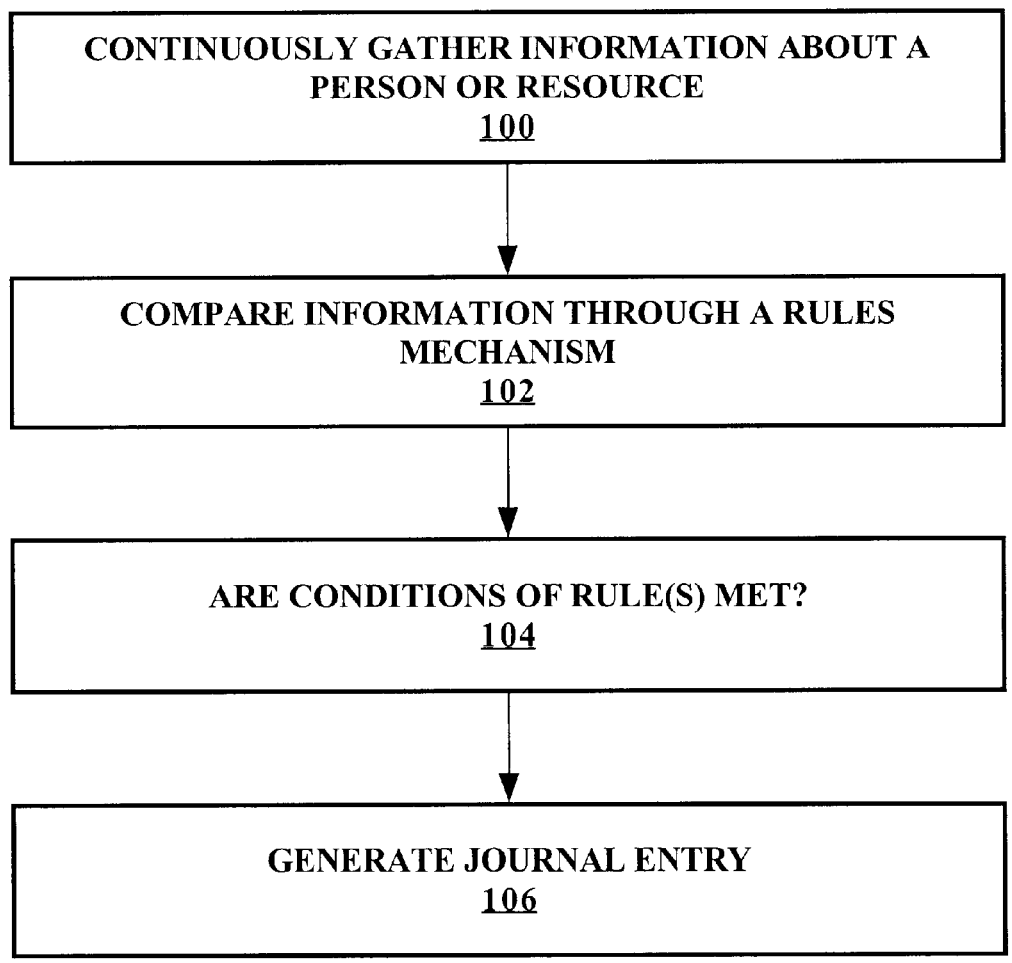
FIG. 1 illustrates a general overview of generating a journal entry.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

A thorough and trusted system for journal entry could aid corporations, governments, and, most of all, individuals and families. Corporations and governments are able to review past business meetings, both formal and informal, and provide a mechanism for recording histories that reduce overhead costs of a manual system. Individuals are able to preserve information as memories about themselves for access years later and pass these memories on to their future generations. Of course, the real advantage of this system is that the effort of starting and maintaining a system of thorough record keeping is automated, thereby reducing costs, and more significantly, improving reliability and thoroughness. Important occasions are far more likely to be recorded and thus far less likely to be permanently forgotten.

Implementation of a system that monitors information about a person or resource and generates journal entries for that person or resource at the appropriate times will alleviate the problems mentioned previously. The appropriate times for entry generation can be defined for each individual through a rules-based mechanism. The individual defines rules that, when met, automatically generate a journal entry according to a template defined in the computer system.

The general process of generating a journal entry is shown in FIG. 1. Information is continuously gathered about a person or resource 100 that will be stored and compared through a rules mechanism 102. Should the conditions of the designated rules be met 104, a journal entry is generated 106. For instance, a user might tell a system that whenever a group of their friends are gathered together in one place, and if it is the birthday of one of the people gathered, a journal entry should then be generated about the user's attendance to the birthday party for the friend. The entry includes the names of those present, where they were, and what they did, as well as any additional information the user entered into an electronic calendar kept on the system.

This journal system is general enough to work for any entity for which pervasive information is known. A Global Positioning System (GPS) device attached to a suitcase (with sensors hooked up to the suitcase) records and shares information about its surroundings. Rules and templates are defined for creating journal entries for the suitcase. Hereafter, the entity, be it a person, animal, object, etc., will be referred to as a 'person', without loss of generality.

Figure 2:
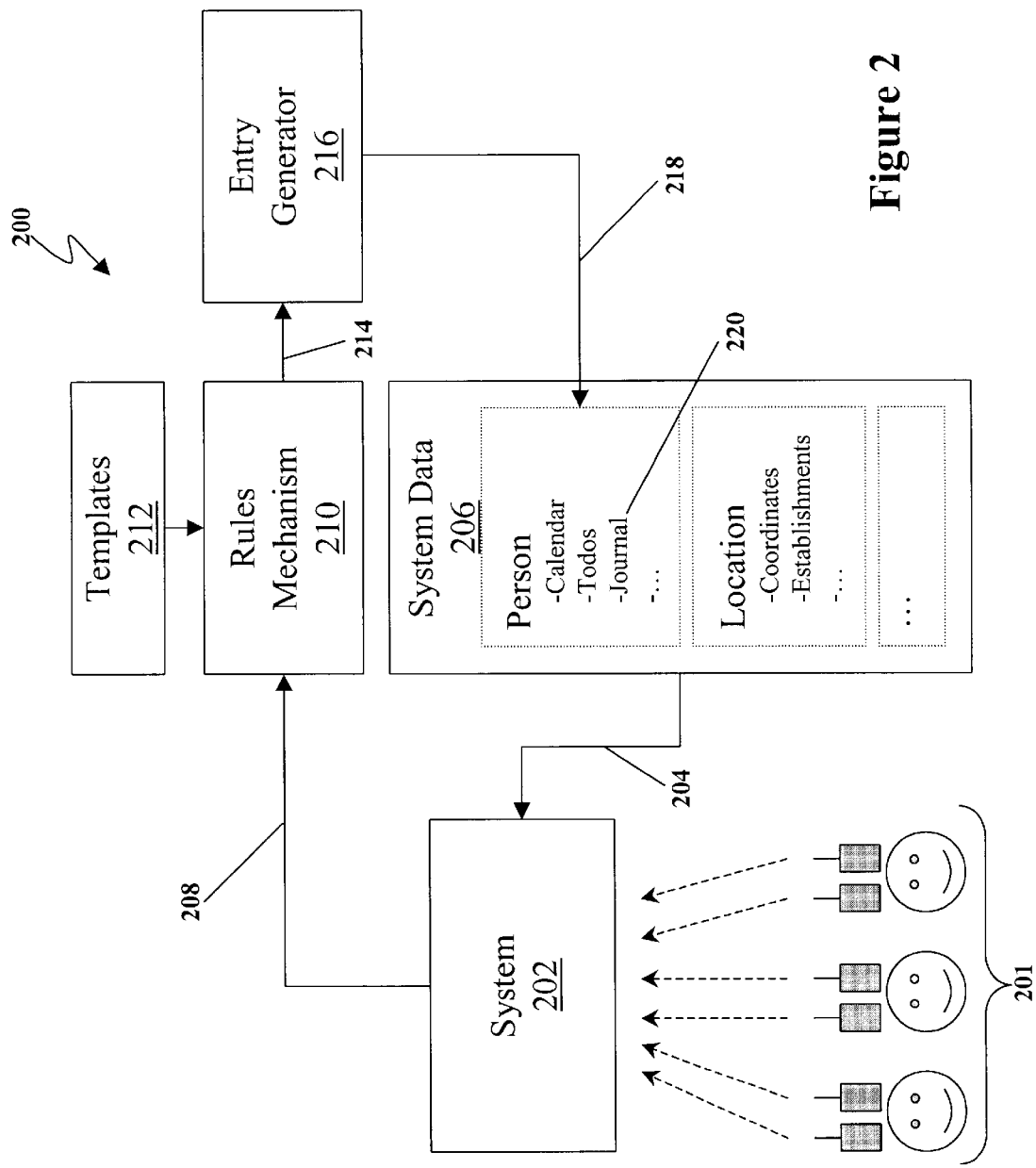
FIG. 2 illustrates a general system used for data input and filtering.

FIG. 2 shows an illustration of parts of the journal system 200 used for data input and automatic journal entry. Computing system 202 continuously gathers and stores external information 201. Information does not need to be obtained from personal devices only; any external device may communicate information to the system. Therefore, this is a continuous process so as long as the devices are transmitting information.

Information internal to the system is then gathered 204 from the system data 206 and combined with the information obtained externally to the system 201. System data 206 includes, for example, calendar entries, past journal entries, associates of resources with locations, etc. The information is gathered by, for example, electronic personal/corporate calendars, previous journal entries, coordinates from a GPS device, activity on a personal computer or hand-held device, communication through a cell phone or pager, and other similar devices. Once gathered, the combined information is passed 208 to the rules mechanism 210.

Using the information 208 gathered by the computing system 202, the rules mechanism 210 evaluates whether or not the factors merit a journal entry. If so, the rules mechanism gathers the appropriate template 212 for such an entry. Both the data and template are then passed 214 to A an entry generator 216. The generator 216 then creates an entry through a transformation process, which applies the information given by the rules mechanism 210 to the template 212, and produces a journal entry that is sent and inserted 218 into the person's journal 220.

Figure 3:
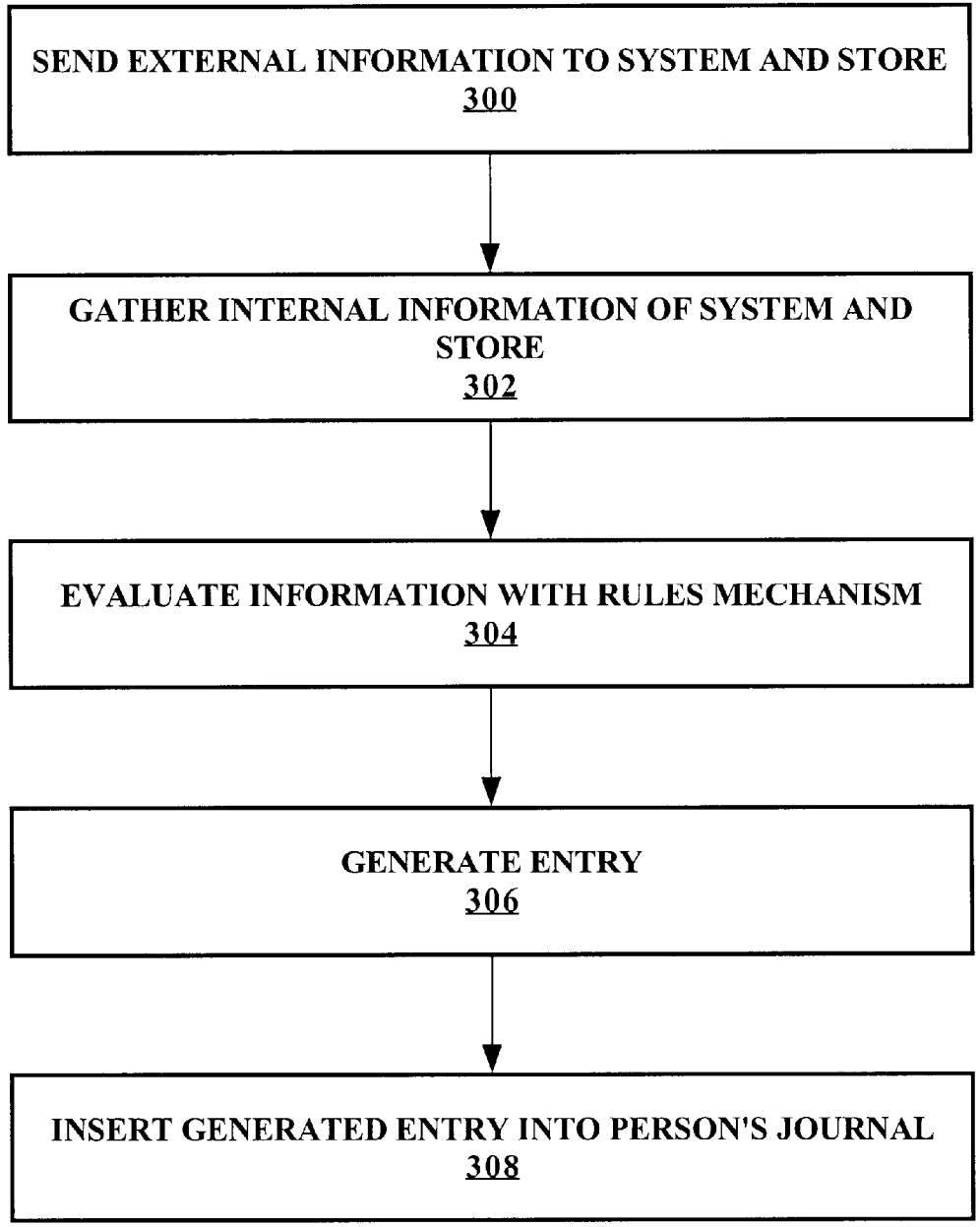
FIG. 3 illustrates a journal entry process.

FIG. 3 further illustrates the flow of the journal entry process for the system in FIG. 2. External information or data 201 is sent to the computing system 202 and stored 300. After all information is received, the internal information of the system is gathered and stored 302 to be evaluated for possible journal entry. All data is to be evaluated according to a rules-based mechanism 304. Once rules are applied and a decision for journal entry is made, a proper template is selected and populated with the data to create an entry 306 by entry generator 214. This entry is then inserted and stored into a person's journal 308.

Figure 4:
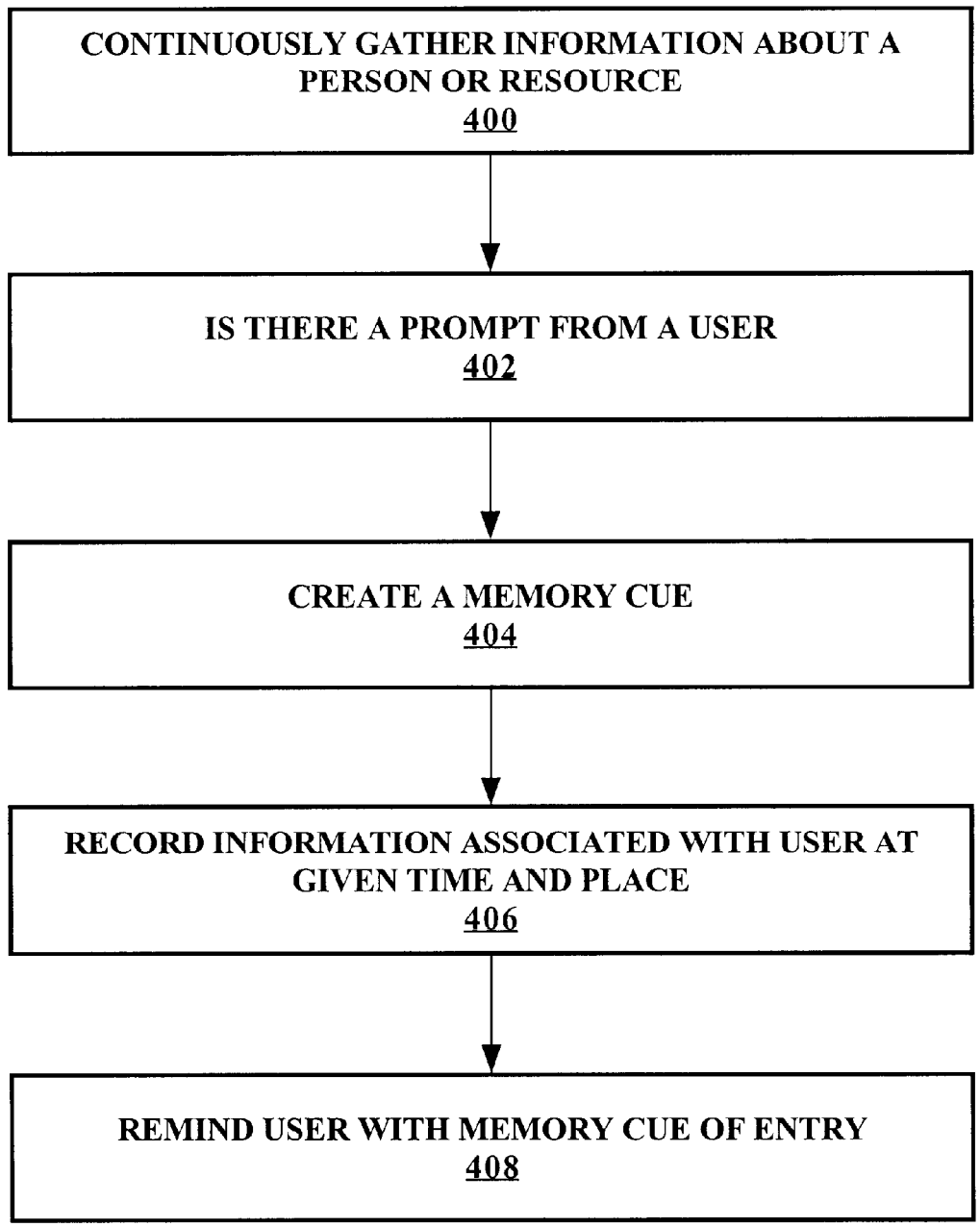
FIG. 4 illustrates a general overview of the process of the creation of reminders.

In a second embodiment, the invention is extended to include creation of reminders for journal entries that alert a user of previously recorded information. This embodiment allows for creation of triggered memory cues for delayed journal entries. FIG. 4 shows the general overview of the process of the creation of reminders. The system continuously gathers information about a person or resource 400, the system waits for prompts from a user 402 to create a memory cue 404, waits for information recorded that associates the user at the given time and place 406, and then activates a reminder to alert the user of the entry 408. The user then acknowledges the completed journal entry or manually adds additional information, which is then stored in their journal records.

FIG. 5 illustrates 500 the system 200 of FIG. 2 with new elements 506 and 507. As with the system of FIG. 2, computing system 503 continuously receives and stores external information 501. The system additionally stores internal data 502 about individuals, places, and resources associated with possible future journal entries (i.e., calendar entries, old journal entries 508, locator information (e.g., GPS 510), etc.). Such information is obtained by electronic sources, such as personal calendars located within the system (or transferred thereto from remote sources). System 503 then receives a request for a delayed journal entry memory cue by a user 504. Information internal to the system is gathered 511 from the internal system data 502 and combined with the information obtained externally to the system 501. Once gathered, the combined information is passed 505 to data filter 506. Data filter 506 separates data relevant to requester 504. The filtered data is sent to the journal memory cue generator 507. The memory cue generator will create a time-based cue for completion of the template entry, either automatically or manually by the user. Once a cue is created, it is populated with known internal system data 502 and waits until this memory cue is activated at a later time, for instance, when the cued event for a journal entry actually takes place or soon thereafter, the journal entry is completed and placed 509 in a person's journal 508.

FIG. 6 illustrates a sample rules template 600 for the preferred embodiment described above. Shown in the template is a method using the XML standard for document formatting, but other formatting methods can also be used for defining a rules mechanism for journal entry.

CONCLUSION

A system and method has been shown in the above embodiments for the effective implementation of rules-based automatic generation of journal entries. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware and specific journal entry types, rules, filtering techniques, sources of input data or template requirements.

The above enhancements for icons and its described functional elements are implemented in various computing environments. For example, the present invention may be implemented on a conventional IBM PC or equivalent, multi-nodal system (e.g., LAN) or networking system (e.g., Internet, WWW, wireless web). All programming, templates, and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of database programming.

What is claimed is:

1. A computer-based system automatically gathering and storing data for historical recording of events related to an entity over a period of time, said system comprising:

a computing system, said computing system receiving and storing in first computer storage a plurality of external data inputs, said data inputs comprising activity information about one or more entities communicated from one or more devices;

second computer storage containing internally gathered information with respect to said one or more entities;

third computer storage storing one or more journal entry templates;

a rules-based mechanism receiving a combination of said external and internal entity data, comparing the combination to determine if, based on rules from said rules-based mechanism, a journal entry for a selected entity should be made;

a journal entry generator, said journal entry generator receiving a selected journal template based on an affirmative comparison by said rules-based mechanism, populating said template with selected entity specific data from said combination data and creating a journal entry, and wherein said journal entry is stored in computer storage.

2. A computer-based system automatically gathering and storing data for historical recording of events related to an entity over a period of time, as per claim 1, wherein said system comprises one or more systems located locally or connected by networks comprising any of: LANs, WANs, cellular, Internet, Web or wireless web based connections.

3. A computer-based system automatically gathering and storing data for historical recording of events related to an entity over a period of time, as per claim 1, wherein said internal sources of input include one or more of: electronic calendar entries, previous journal entries, associates of entities, and locations.

4. A computer-based system automatically gathering and storing data for historical recording of events related to an entity over a period of time, as per claim 3, wherein said internal sources further comprise sources of input including that collected from personal devices such as a GPS device, hand-held device, cell phone, and paging device.

5. A computer-based system automatically gathering and storing data for historical recording of events related to an entity over a period of time, as per claim 1, wherein said external sources further comprise sources of input including that are collected from personal devices such as a GPS device, hand-held device, cell phone, and paging device.

6. A computer-based system automatically gathering and storing data for historical recording of events related to an entity over a period of time, as per claim 1, wherein said system further comprises a memory cue generator for delayed journal entries.

7. A computer-based system automatically gathering and storing data for historical recording of events related to an entity over a period of time, as per claim 6, wherein said memory cue generator includes a mechanism to notify a requestor of said memory cue.

8. A method of gathering and storing data for computer based, historical recording of events related to an entity over a period of time, said method comprising:
 electronically receiving and storing in computer storage a plurality of external data inputs, said data inputs comprising information about one or more entities, said data inputs received from one or more devices;
 gathering and storing from computer-based systems internal information with respect to said one or more entities;
 retrieving one or more stored journal entry templates;
 receiving a combination of said external and internal entity data, comparing the combination to determine if, based on preset rules, a journal entry for a selected entity should be made;
 transferring a selected journal template based on an affirmative comparison, populating said template with selected entity specific data from said combination data,
 creating a journal entry, and
 storing in computer-storage said journal entry.

9. A method of gathering and storing data for computerized, historical recording of events related to an entity over a period of time, as per claim 8, said method further comprising generating a memory cue/reminder for said journal entry.

10. A method of gathering and storing data for computerized, historical recording of events related to an entity over a period of time, as per claim 9, said method further comprising delaying said journal entry until a time designated by a user requesting said memory cue/reminder.

11. A method of gathering and storing data for computerized, historical recording of events related to an entity over a period of time, as per claim 8, said method further comprising sending a memory cue/reminder to a user when a journal entry is generated.

12. An article of manufacture comprising a computer program product, said computer program product comprising a computer usable medium having computer readable program code:
 said computer readable program code embodying a method comprising the steps of:
  receiving and storing a plurality of external data inputs over a period of time, said data comprising information about one or more entities;
  gathering and storing internal information with respect to said one or more entities;
  retrieving one or more stored journal entry templates;
  receiving a combination of said external and internal entity data, comparing the combination to determine if, based preset rules, a journal entry for a selected entity should be made,
  transferring a selected journal template based on an affirmative comparison, populating said template with selected entity specific data from said combination data,
  transforming said populated template into a journal entry, and storing said journal entry.

13. A computer-based system capable of gathering and storing data for historical recording of events related to an entity over a period of time, said system comprising:
 a computing system, said computing system receiving and storing in first computer storage a plurality of external data inputs, said data comprising event information about one or more entities;
 second computer storage containing internally gathered information with respect to said one or more entities;
 a data filter, said filter recognizing entity specific data,
 a rules-based element, said element selecting and populating a relevant template based on said recognizing step,
 a journal memory cue generator, said journal memory cue generator creating a reminder for delayed journal entry, and
 wherein said delayed journal entry is created at the time of said reminder by combining said filtered external and internal data and any data entered manually by a requestor.

14. A computer-based system capable of gathering and storing data for historical recording of events related to an entity over a period of time, as per claim 13, wherein said system comprises one or more systems located locally or connected by networks comprising any of: LANs, WANs, cellular, Internet, Web or wireless web based connections.

15. A computer-based system capable of gathering and storing data for historical recording of events related to an entity over a period of time, as per claim 13, wherein said internal sources of input include one or more of: electronic calendar entries, previous journal entries, associates of entities, and locations.

16. A computer-based system capable of gathering and storing data for historical recording of events related to an entity over a period of time, as per claim 15, wherein said internal sources further comprise sources of input including that collected from personal devices such as a GPS device, hand-held device, cell phone, and paging device.

17. A computer-based system capable of gathering and storing data for historical recording of events related to an entity over a period of time, as per claim 13, wherein said external sources further comprise sources of input including that are collected from personal devices such as a GPS device, hand-held device, cell phone, and paging device.

* * * * *